Aug. 29, 1950     J. W. CROWNOVER     2,520,758
PARALLAX CORRECTION LENTICULAR SCREEN ARRANGEMENT FOR
COOPERABLE INDICATORS MOVABLE IN PARALLEL PLANES
Filed July 24, 1946     2 Sheets-Sheet 1
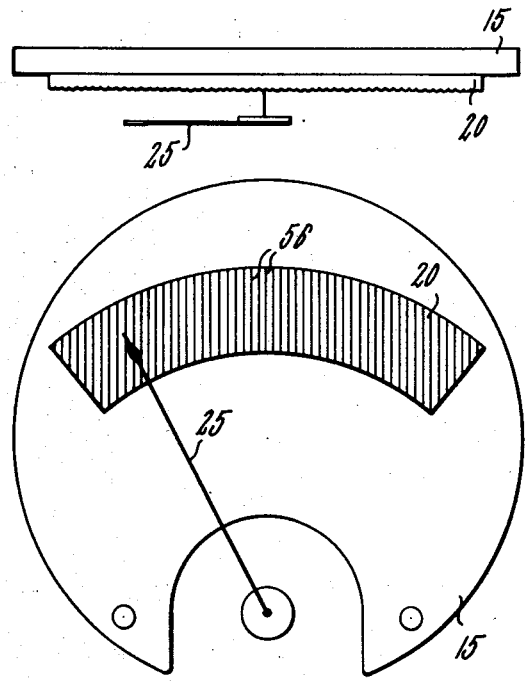
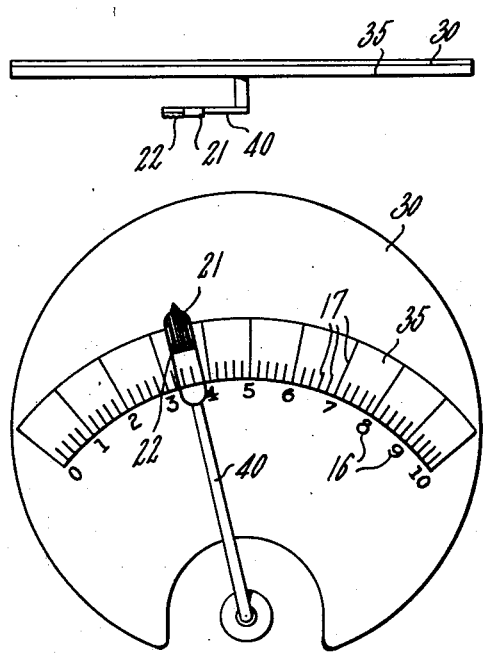
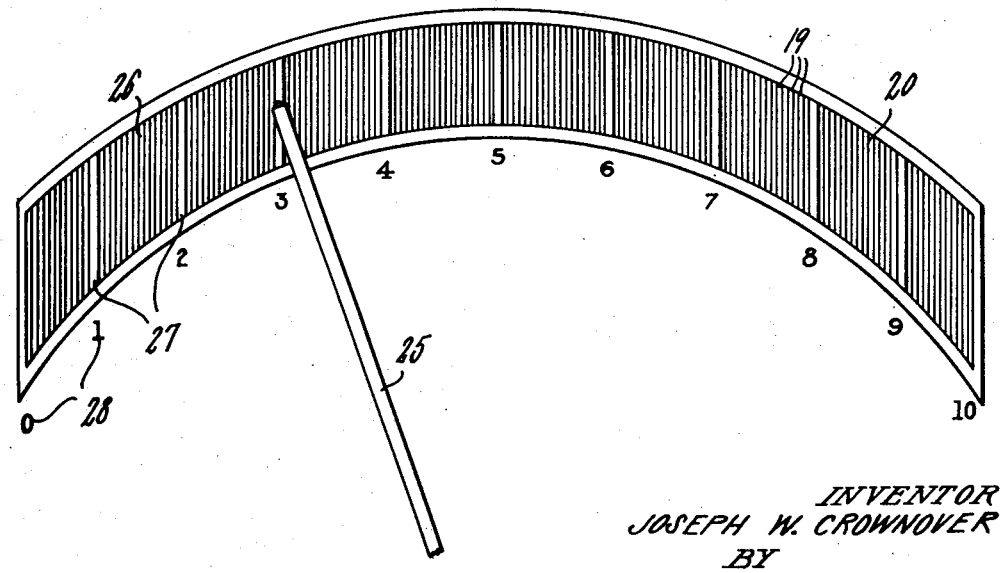
INVENTOR
JOSEPH W. CROWNOVER
BY
Richard A. Marsan
ATTORNEY

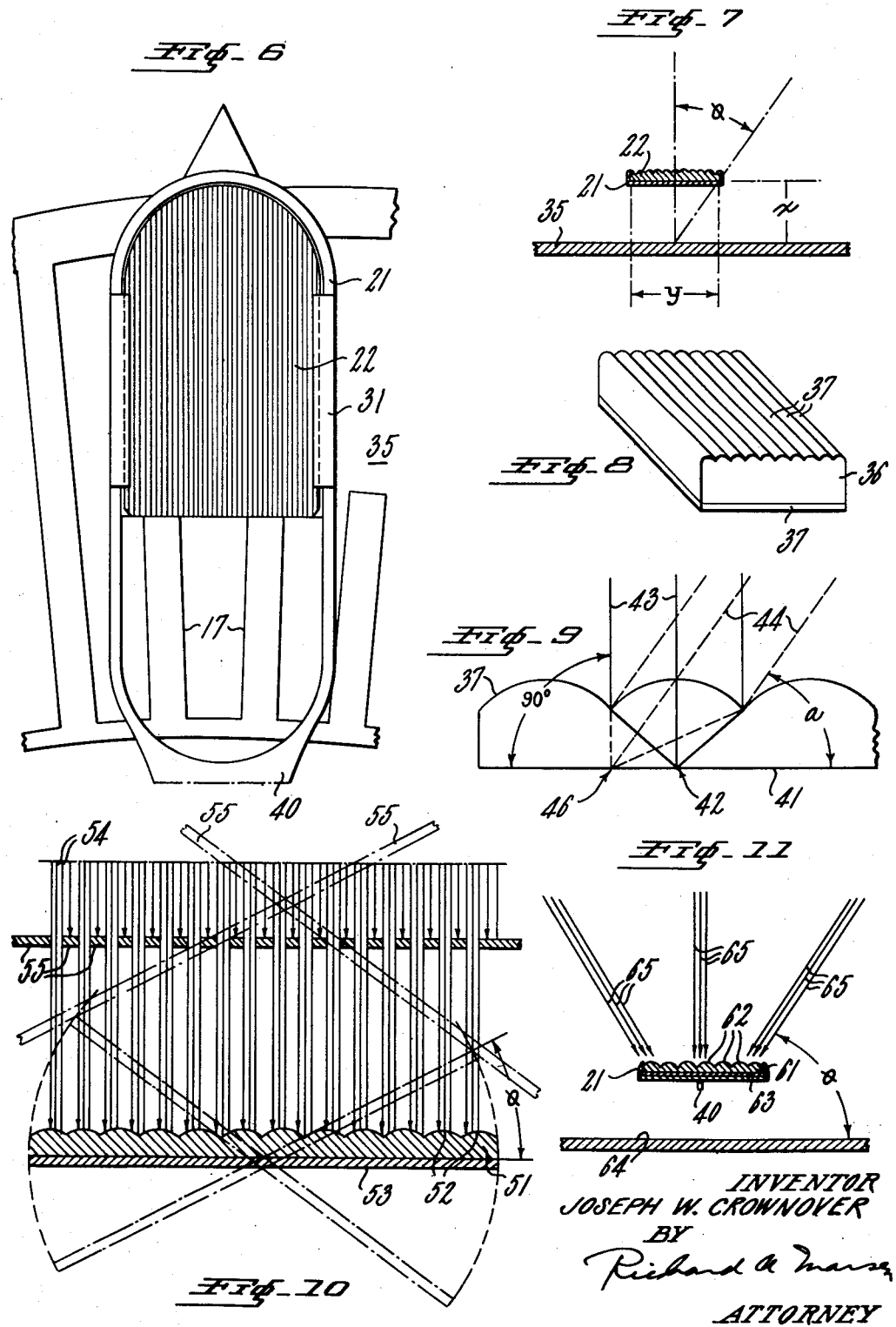

Patented Aug. 29, 1950

2,520,758

UNITED STATES PATENT OFFICE 2,520,758

PARALLAX CORRECTION LENTICULAR SCREEN ARRANGEMENT FOR COOPERABLE INDICATORS MOVABLE IN PARALLEL PLANES

Joseph W. Crownover, Hartsdale, N. Y.

Application July 24, 1946, Serial No. 685,793

4 Claims. (Cl. 88—1)

This invention relates to anti-parallax screen arrangements, and more particularly to anti-parallax screens adapted for incorporation in indicating meters.

Parallax has presented quite a problem in the reading of meters. By parallax is meant the effects which occur when the indicating pointer, for example, of a meter is viewed with respect to the scale from different angles. Due to the optical relationships involved and the spacing of the pointer from the dial, different readings will be obtained from different angles of observation. In an ordinary meter, this is true whether the reading is taken with one eye closed or with both eyes open.

Various expedients have been tried to eliminate or overcome parallax effects. Among others, a thin reflector has been placed across the dial plate directly below or above the dial markings. With this reflector, the meter pointer may be lined up with its image in the reflector so that the observations of the meter may be taken from the correct angle to assure accuracy. However, only one eye can be used in taking such readings and the necessity for moving the reader's head to one particular position detracts from the desirability of this method. Furthermore, it is impossible to take successive readings rapidly with this arrangement.

Other types of meters avoid parallax effects by utilizing a projection arrangement wherein a shadow indicator is projected on to the meter dial. As such shadow obviously coincides in space with the dial surface, readings can be taken with both eyes, from any one of a number of different positions and with no parallax effect. However, this system is rather expensive and is therefore not practical for inexpensive type meters.

In accordance with the present invention, an anti-parallax is provided either on the dial plate or on the meter pointer, or on both, of such a nature that the spaced meter pointer and markings on the dial plate will appear to lie in the same plane when the meter is read from any point within a wide angle relative to the meter face. Specifically, there will be no parallax effect when the meter is read from any point within the normal field of lateral vision of the meter. In the present instance, this is accomplished by using an anti-parallax screen providing a stereoptical effect and so prepared that, with the use of the screen, both the dial markings and the pointer appear to coincide with each other in the same plane.

It is therefore among the objects of the present invention to provide inexpensive parallax correction arrangements for cooperable indicators movable in parallax planes; to provide such arrangements including an anti-parallax screen having the power of making a meter indicating pointer and a dial plate spaced therefrom apparently lie in the same plane; to provide such arrangements including a lenticular film arranged either on the dial plate or on the meter pointer and effective to attain apparent planar coincidence of the pointer and the dial plate; and in general, to provide simple means for eliminating parallax in inexpensive type indicating meters.

These and other objects, advantages and novel features of the invention will be apparent from the following description and the accompanying drawings. In the drawings:

Fig. 1 is an elevation view of the invention as embodied in the dial plate of a meter.

Fig. 2 is a top plan view of the meter shown in Fig. 1.

Fig. 3 is a view similar to Fig. 1 showing the invention as embodied in the indicating pointer of a meter.

Fig. 4 is a top plan view of the meter shown in Fig. 3.

Fig. 5 is an enlarged partial elevation view of the dial plate and pointer of the meter shown in Fig. 1.

Fig. 6 is an enlarged partial elevation view of the pointer and dial plate of the meter shown in Fig. 3.

Fig. 7 is a diagrammatic sectional view illustrating certain optical relationships applying to the pointer and dial plate of the meter of Fig. 3.

Fig. 8 is a greatly enlarged perspective view of an anti-parallax screen used with the present invention.

Fig. 9 is a diagram illustrating optical relationships of the anti-parallax screen of Fig. 8.

Fig. 10 is a diagrammatic view illustrating the processing of the dial plate of the meter of Fig. 1.

Fig. 11 is a diagrammatic view illustrating the processing of the pointer of the meter of Fig. 3.

As stated, the principle of the present invention relies upon creating the optical illusion of causing substantially linear elements, actually located in two parallel planes separated in space, to appear to be coplanar. According to the present invention, this illusion is accomplished by using an anti-parallax screen comprising a thin sheet of properly prepared, finely lenticulated photographic film, hereinafter referred to as lenticular film.

In accordance with the present invention, lenticulations are embossed or otherwise formed in the front surface of a sheet of material, with the focal planes of the lenticulations being in the smooth back surface of the film. This smooth back surface is covered with a suitable photosensitive emulsion and is photographically exposed to a configuration of lines representing the desired meter markings to be placed on a meter dial. The photographic exposure is made with the configuration of lines spaced at a focal depth from the smooth rear surface of the film equal to the normal separation of the plane of a meter dial and the plane of movement of the meter pointer.

Such lenticular film, prepared in the above manner, is then incorporated either in the meter dial plate or in the meter pointer. When a meter incorporating such anti-parallax screen is viewed, the eye will build up from the various lenticulations a complete image of a portion of the dial plate markings behind the vane, whereby a slightly different composite image is observed from each horizontal angle with respect to a perpendicular through the center of the dial plate. Since each eye builds up its own composite image from different angles, the two images will be different and mutually exclusive so that, as the observer moves about within the range of vision of the meter, the apparent coincidence between the pointer and a dial marking will not change.

The resultant effect, due to the predetermined exact placement of the images of the graduation markings in relation to the lenticulations and to the spacing between the pointer and dial surfaces, causes the surface of the meter dial to appear closer to the eyes to an extent equal to the distance between the dial plate and the meter pointer. Consequently, the images received by the eyes from the dial markings on the lenticular film emulsion appear to coincide with the plane of the meter pointer and thus parallax is eliminated. The parallax correction screen may be placed either on the meter dial or on the meter pointer.

Referring more particularly to the drawings, Figs. 1 and 2 illustrate a meter 15 having a dial plate 20 consisting of lenticular film anti-parallax screen prepared in the above manner. For purposes of illustration, the lenticulations are shown as greatly enlarged and, in actual practice, would not be apparent to visual observation. The usual meter pointer 25 is provided, and has a length slightly less than the outer radius of dial plate 20. Thereby, a discontinuity of the pointer with respect to the dial markings is provided, which is useful in obtaining radial alignment of the pointer with the dial markings.

Figs. 3 and 4 illustrate an alternative embodiment in which the lenticular anti-parallax screen is mounted in the meter pointer. In the arrangement shown in Figs 3 and 4, a meter 30 is provided having the usual plane dial plate 35 containing indicia 16 and graduations 17. In this example, pointer 40 is formed at its outer end with an open bracket 21 in which is received a small piece of lenticular film 22 prepared in the above described manner. Film 22 is discontinuous radially of pointer 40 with respect to the graduations of dial 35 so that a positional comparison may be made between the dial graduations and the composite images received by the eye from film 22. Thereby, the meter may be read from any point within a wide angle to the meter face without parallax effects.

Fig. 5 is a greatly enlarged view of the dial 20 of meter 15. As shown, dial 20 comprises a lenticulated film in which the axes of the lenticulations extend in a vertical direction. Thereby, parallax, due to observations from different horizontal angles, is eliminated by the images on the light exposed emulsion of the film, and parallax due to observations from different vertical angles is eliminated due to the lining up of the end or tip of pointer 25 with the dial indications. Dial plate 20 may, for example, comprise a lenticular film 26 having major graduations 27 and intermediate minor graduations 19. Indicia 28 are provided for easy reading of the meter.

Fig. 6 is an enlarged view of the pointer and dial of meter 30. As shown, film piece or anti-parallax screen 22 is mounted within channels 31 near the outer end of bracket 21 on the outer end of pointer 40. As the indicia 17 are not concealed by film 22 positional comparison of the markings or images of film 22 may thus be made with the indicia 17 of dial plate 35 to obtain a reading of the meter from any point within a wide horizontal angle of vision without parallax.

The principles of the invention may be best understood by a reference to Figs. 7, 8 and 9. Fig. 7 shows pointer bracket 21 supporting film 22 with relation to dial plate 35. The strip of film may be of any desired length, and may extend over the entire length of bracket 21 or be only in the outer portion thereof as indicated in Fig. 6. The width of film strip 22 is determined by the greatest desirable angular variation of the reading from the perpendicular, as represented by angle $\phi$, and by the distance $x$ between the vane and the dial plate. The screen width $y$ should be slightly greater than $2x.\tan\phi$ to provide a clear image of the pointer at the extremities of angle $\phi$.

The film is illustrated more particularly in Fig. 8 as comprising a body 36 on the front surface of which are embossed or otherwise formed cylindrical lenticulations 37. A photographic emulsion 37 is prepared on the back of the film. Fig. 9 shows a greatly enlarged view of the lenticular film having lenticulations 37. Light rays striking a particular lenticulation 37 and arriving perpendicularly to the back surface 41 of the film all converge at point 42, which is the radial center of the surface of lenticulation 37. This is illustrated by the solid lines 43. On the other hand, light from an angle $a$ as indicated by the broken lines 44 is all reflected from a point 46 in back surface 41. Consequently, the particular portion of back surface 41 which is seen at any one time depends upon the angle at which the observation is taken; i. e. the angle of the light rays to the surface 41. This effect is taken advantage of in preparing the lenticulated film for use on the meter.

Fig. 10 illustrates the preparation of a meter dial plate anti-parallax screen. In this greatly enlarged view the lenticulated film is indicated at 51 as having lenticulations 52 on its front surface and a photographic emulsion 53 on its rear surface. A grid consisting of opaque strips 55 is arranged to be rotated with film 51, and in relatively fixed spacial parallel relation thereto, about an axis perpendicular to the plane of the paper, and extending through the center of the film, through an angle $\phi$ equal to the greatest desired angle of observation. During such rotation, parallel light rays from a suitable fixed source are directed toward the front surface of the film through the strips 55 of the grid, as indicated by lines 54. These strips break up the light rays and the grid is photographed on emulsion 53 as a series of linear images having a focal depth equal to the spacing of the pointer from the dial. As a consequence, the series of grid light marks provides the dial markings 56 which are observed when a reading is taken of the meter shown in Fig. 1.

No matter at which angle within the limits of angle $\phi$ the reading is taken, one of the marks or images will assume a definite spacial relation with the end of the meter pointer and such alignment will not apparently change even though the angle at which the reading is taken is altered. In other words, assuming that a person views the meter of Fig. 1 from a position far to the right of center, pointer 25 will apparently have a certain spacial relation with one of the graduations 56. As the person moves to the left relative to meter 15, the relation between the end of pointer 25 and graduations 56 will not apparently alter. This is due to the fact that, as such movement of the reader toward the left takes place, different successive images 56 are observed depending upon the particular angle. These images will progressively appear to move to the right along the back surface of the film. However, at the same time, pointer 25 likewise appears to move to the right as respects the observer, and thus continually maintains its spacial relation with the same graduations 56. An optical illusion is thus produced in which it appears that pointer 25 is in the same plane with graduations 56, and thereby parallax is eliminated.

Substantially, the same effect takes place when the lenticular film is mounted in the meter pointer. Such film is prepared as shown in Fig. 11, in which a piece of lenticular film 61, having front surface lenticulations 62 and a photographic emulsion 63 on its rear surface, is mounted in bracket 21 of meter pointer 40. Meter pointer 40 is mounted at a distance from a reference plane 64 equal to the normal distance of the plane of pointer movement from the dial plate of meter 30 of Fig. 3. A source of light, indicated by the solid lines 65, is then swung through an arc having its center in plane 64 in alignment with the center of pointer 40. This light may be directed upon film 61 through a grid, or may alternatively comprise a single light ray. The light is swung between two extreme positions each at an angle $\phi$ with respect to plane 64.

Thus, a series of linear images are formed in photographic emulsion 63. Consequently, when meter 35 is read with the film in place on pointer 40, the graduations or images in light exposed photographic emulsion 63 appear to lie in the same plane as dial 35 of meter 30 as they were photographed therein with emulsion 63 at the distance $x$ from plane 64. Consequently, no matter from what angle the meter is viewed, one of the graduations in photographic emulsion 63 will be aligned with a graduation on dial plate 35 and will stay aligned with such graduation, even though the relative position of the meter observer is changed. Accordingly, parallax effects are eliminated as the pointer appears to coincide in plane with the dial plate 35.

Among other variations of the invention, a meter dial may be constructed in which the dial is visible and consists of large graduation markings, at all angles except the critical angle. Furthermore, the invention may be used to provide larger graduation markings at certain critical angles and smaller subdivisions in between such graduation markings. This will facilitate reading of the meter through providing greater resolving power.

In accordance with the invention, spherically lenticulated film may also be used as an anti-parallax screen. When either cylindrically or spherically lenticulated film is used, the film, width thickness, and number of lenticulations per unit of length or area are determined by the degree of resolution desired in reading the meter.

The term "focal depth" as used in the claims means the distance between the photographic emulsion of the lenticular film and the other indicator at the time the indicia are photographed on said emulsion.

While specific embodiments of the invention have been shown and described in detail to illustrate the application of the principles thereof, it will be understood that the invention may be otherwise embodied without departing from such principles.

What is claimed is:

1. A parallax correction system for a pair of indicators relatively movable in substantially constantly spaced parallel planes, one of said indicators comprising at least one linear index lying substantially in the plane of relative movement of said indicator; the other indicator carrying lens means having a multi-cylindrical surface on its face nearest the eye of the observer and a substantially flat surface on its opposite face; said substantially flat surface carrying an exposed photographic film having a multiplicity of closely spaced images of linear indicia at a focal distance substantially equal to such substantially constant spacing; whereby, said images appear to lie in a plane coincident with the plane of relative movement of said one indicator, and one of said images will bear a constant relation to said one index, when viewed through said multi-cylindrical surface, throughout the angle of observation of said indicators; said indicia and said index being alignable in rectilinear relation.

2. A parallax correction system for a pair of indicators relatively movable in substantially constantly spaced parallel planes, one of said indicators comprising at least one linear index lying substantially in the plane of relative movement of said indicator; the other indicator carrying a lenticular film having a multi-cylindrical surface on its face nearest the eye of the observer and a substantially flat surface on its opposite face; said substantially flat surface carrying an exposed photographic film having a multiplicity of closely spaced images of linear indicia at a focal distance substantially equal to such substantially constant spacing; whereby, said images appear to lie in a plane coincident with the plane of relative movement of said one indicator, and one of said images will bear a constant relation to said one index, when viewed through said lenticular film throughout the angle of observation of said indicators; said indicia and said index being alignable in rectilinear relation.

3. A parallax correction system for a plane dial carrying at least one linear index, an indicator movable over said dial in a plane spaced a substantially constant distance from said dial, said indicator carrying lens means having a multi-cylindrical surface on its face nearest the eye of the observer and a substantially flat surface on its opposite face; said substantially flat surface carrying an exposed photographic film having a multiplicity of closely spaced images of linear indicia at a focal distance substantially equal to such substantially constant spacing; whereby, said images appear to lie in a plane coincident with the plane of said dial, and one of said images will bear a constant relation to said one index, when viewed through said multi-cylindrical surface, throughout the angle of observation of said dial and indicator; said indicia and said index being alignable in rectilinear relation.

4. A parallax correction system for a plane dial carrying at least one linear index, an indicator movable over said dial in a plane spaced a substantially constant distance from said dial, said indicator carrying a lenticular film having a multi-cylindrical surface on its face nearest the eye of the observer and a substantially flat surface on its opposite face; said substantially flat surface carrying an exposed photographic film having a multiplicity of closely spaced images of linear indicia at a focal distance substantially equal to such substantially constant spacing; whereby, said images appear to lie in a plane coincident with the plane of said dial, and one of said images will bear a constant relation to said one index, when viewed through said lenticular film throughout the angle of observation of said dial and indicator; said indicia and said index being alignable in rectilinear relation.

JOSEPH W. CROWNOVER.

REFERENCES CITED

The following references are of record in the file of this patent:

UNITED STATES PATENTS

| Number | Name | Date |
|---|---|---|
| 1,788,011 | Bryce | Jan. 6, 1931 |
| 2,277,957 | Conners | Mar. 31, 1942 |